United States Patent [19]
Rao

[11] Patent Number: 5,255,881
[45] Date of Patent: Oct. 26, 1993

[54] LIFT AUGMENTATION FOR HIGHLY SWEPT WING AIRCRAFT

[75] Inventor: Dhanvada M. Rao, Yorktown, Va.

[73] Assignee: Vigyan, Inc., Hampton, Va.

[21] Appl. No.: 857,397

[22] Filed: Mar. 25, 1992

[51] Int. Cl.$^5$ .................. B64C 23/06; B64C 21/04
[52] U.S. Cl. .................................. 244/199; 244/36; 244/204; 244/207
[58] Field of Search .............. 244/35 A, 35 R, 36, 244/199, 204, 207, 212, 200

[56] References Cited

U.S. PATENT DOCUMENTS

| | | | |
|---|---|---|---|
| 3,072,368 | 1/1963 | Seddon | 244/200 |
| 3,090,584 | 5/1963 | Kuchemann | 244/199 |
| 3,093,350 | 6/1963 | Wilkins | 244/207 |
| 3,471,107 | 10/1969 | Ornberg | 244/199 |
| 3,480,234 | 11/1969 | Cornish, III | 244/199 |
| 4,026,500 | 5/1977 | Grow | 244/36 |
| 4,267,990 | 5/1981 | Staudacher | 244/199 |
| 4,697,769 | 10/1987 | Blackwelder et al. | 244/199 |
| 5,158,251 | 10/1992 | Taylor | 244/199 |

FOREIGN PATENT DOCUMENTS

| | | |
|---|---|---|
| 1511212 | 12/1968 | France . |
| 890418 | 2/1962 | United Kingdom . |
| 1332026 | 10/1973 | United Kingdom . |

*Primary Examiner*—Michael S. Huppert
*Assistant Examiner*—Virna L. Ansley
*Attorney, Agent, or Firm*—Wallace J. Nelson

[57] ABSTRACT

A pair of spaced slots, disposed on each side of an aircraft centerline and spaced well inboard of the wing leading edges, are provided in the wing upper surfaces and directed tangentially spanwise toward thin sharp leading wing edges of a highly swept, delta wing aircraft. The slots are individually connected through separate plenum chambers to separate compressed air tanks and serve, collectively, as a system for providing aircraft lift augmentation. A compressed air supply is tapped from the aircraft turbojet power plant. Suitable valves, under the control of the aircraft pilot, serve to selective provide jet blowing from the individual slots to provide spanwise sheets of jet air closely adjacent to the upper surfaces and across the aircraft wing span to thereby create artificial vortices whose suction generate additional lift on the aircraft. When desired, or found necessary, unequal or one-side wing blowing is employed to generate rolling moments for augmented lateral control. Trailing flaps are provided that may be deflected differentially, individually, or in unison, as needed for assistance in take-off or landing of the aircraft.

10 Claims, 3 Drawing Sheets

COMPRESSED AIR
SUPPLY SOURCE

LIFT AUGMENTATION FOR HIGHLY SWEPT WING AIRCRAFT

ORIGIN OF THE INVENTION

This invention was made in the performance of work under NASA Contract Number NAS1-18585 and the Government of the United States accordingly, has certain rights in the invention.

FIELD OF THE INVENTION

This invention relates generally to control of flow over low aspect ratio and highly swept wings of supersonic aircraft, and relates specifically to the application of jet blowing to enhance the lift and aerodynamic control at low angles of attack and subsonic speeds during landing of delta wing, supersonic aircraft.

BACKGROUND OF THE INVENTION

The use of chordwise blowing over wing trailing edge flaps to increase their lift effectiveness, and spanwise blowing to sustain the vortex lift effect of leading edge vortices to higher angles of attack, are known in the prior art. Chordwise flap blowing is limited to aircraft having aft tails or canard surfaces which are needed to balance the nose-down moments associated with flap blowing. Spanwise blowing serves to raise the stall angle-of-attack limit, which is not helpful during landing when the aircraft pitch attitude is limited by tail-end clearance and the forward-view requirements of the pilot. Thus, there is a need in the art for a system to enhance the lift capability of low aspect ratio, highly swept wings of supersonic aircraft to thereby enable slower and safer landing on short runways or unprepared fields. The jet blowing of the present invention artificially creates vortex lift at the low angles of attack when the natural wing vortices are weak or absent, and at the same time, serves to generate a counter balancing nose-up moment to permit the use of trailing edge flaps; these two lift improvement effects then combine to improve the slow landing capability of tail-less swept wing aircraft.

It is therefore an object of the present invention to provide effective pneumatic lift augmentation for highly swept supersonic aircraft at low angles of attack during landing.

Another object of the present invention is to provide selective and controlled jet blowing over wing upper surfaces that enhances the lift capability of low aspect ratio, highly swept wings of supersonic aircraft to enable slower and safer landing on short runways.

A further object of the present invention is a jet blowing system for a highly swept wing supersonic aircraft that augments vortex lift at the low angles of attack when the wing vortices normally are weak or absent.

An additional object of the present invention is a jet blowing system for a highly swept wing, tail-less, supersonic aircraft that generates a counter balancing, nose-up moment that permits the use of trailing edge flaps to thereby improve the slow landing capability of the aircraft.

Another object of the present invention is a jet blowing system for a highly swept wing, tail-less, supersonic aircraft with selective asymmetric or one-side wing blowing to generate rolling moments for augmented lateral control of the aircraft.

Another object of the present invention is a spanwise tangential jet blowing system for the upper surfaces of a highly swept wing, tail-less supersonic aircraft to thereby stimulate vortex formation and resulting suction augmentation to provide a source of additional lift for the aircraft.

Still another object of the present invention is a system for generating vortex lift centered forward of the aircraft center of gravity to thereby produce a nose-up pitching moment which can assist in rotation during take-off and also permit counter-balancing of trailing edge flaps for lift augmentation of tail-less aircraft during the slow landing phase of a flight.

SUMMARY OF THE INVENTION

According to the present invention, the foregoing and additional objects are attained by providing a tail-less, highly swept, delta wing aircraft having a nose and a substantially thick center line profile with slots, connected to a compressed air source, provided in the wing upper surfaces and directed tangentially spanwise toward the thin sharp leading wing edges. A pair of spaced slots are disposed on each side of the aircraft center line and spaced well inboard of the wing leading edges. Each pair of spaced slots are positioned along an imaginary swept back ray originating from and extending aft of the wing apex, with the front member of each slot pair being disposed forward of the aircraft center of gravity and the aft member of each slot pair being disposed aft of the aircraft center of gravity. A compressed air supply is tapped from the aircraft turbojet power plant with separate air tanks and separate plenum chambers being provided for each of the spaced slots. Alternatively, separate power plants may be used as pressure sources. Suitable valves, under the control of the aircraft pilot, or integrated with the automatic control system, serve to selectively provide jet blowing from the individual slots producing high-velocity spanwise sheets of air adjacent to the upper surfaces and across the aircraft wing span. These sheets of jet flow interact with the external flow due to the aircraft forward speed, creating artificial vortices whose suction generates additional lift on the delta-wing type aircraft. When desired, or found necessary, unequal or one-side wing blowing is employed to generate rolling moments for augmented lateral control.

BRIEF DESCRIPTION OF THE DRAWINGS

A more complete appreciation of the invention and many of the attendant advantages thereof will be readily apparent as the same becomes better understood in reference to the accompanying drawings wherein.

DETAILED DESCRIPTION

Figure 1:
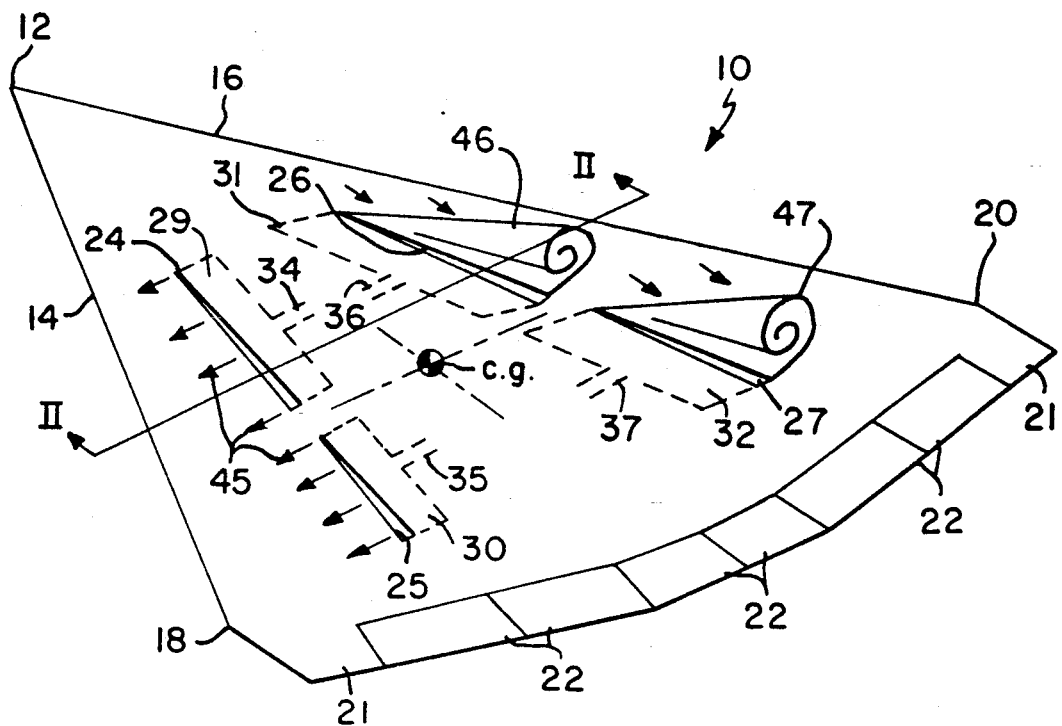
FIG. 1 is a part schematic, top plan, view of an exemplary tail-less, highly swept, delta wing, supersonic aircraft having slotted upper surfaces, according to the present invention.
Figure 2:
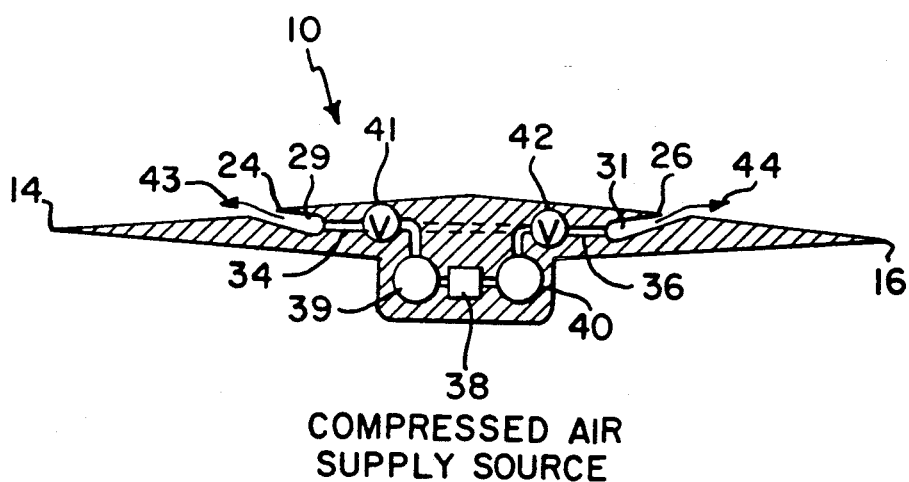
FIG. 2 is a part schematic sectional view of the aircraft shown in FIG. 1 and taken along line II—II thereof.

Referring now to the drawings and more particularly to FIGS. 1 and 2, an exemplary tail-less, highly swept, delta wing, supersonic aircraft is shown and designated generally by reference numeral 10. Aircraft 10 is provided with a sharp nose apex 12 and highly swept thin leading edge surfaces 14, 16 trailing therefrom to a point where they taper at areas 18, 20 toward the aft end 21 of aircraft 10.

A plurality of control flaps 22 are disposed along the aft end of aircraft 10. Flaps 22 may be deflected differentially, individually, or in unison, and in the positive or negative direction, under the control of the aircraft pilot, as needed for assistance in take-off or landing of the aircraft.

A pair of spaced slots are disposed on each side of the centerline of aircraft 10, as designated by reference numerals 24, 25 and 26, 27. Slots 24 and 26 are disposed forward of the aircraft center of gravity (C.G.) while slots 25, 27 are disposed aft of the aircraft center of gravity. Slot pairs 24,25 and 26,27 are positioned along separate imaginary rays originating from and extending aft of the wing apex, swept well inboard at equal distances from the thin sharp leading edges 14,15, and spaced from the centerline of aircraft 10.

A separate plenum chamber is provided within aircraft 10 for each of respective slots 24,25,26 and 27. These plenum chambers are shown in phantom in FIG. 1 and designated respectively, by reference numerals 29,30,31 and 32. Individual conduits 34,35,36 and 37 lead from individual suitable pressure supply sources or tanks, not shown in FIG. 1 but two of which are shown in FIG. 2 and designated, respectively, by reference numerals 39,40.

Each conduit 34,35,36 and 37 is provided with a control valve therein to permit the aircraft pilot to control the flow of pressurized air from tanks 39,40 (and the others, not shown) to the respective plenum chambers and slots. The valves for controlling the flow from supply source tanks 39,40 through conduits 34 and 36 are schematically shown in FIG. 2 and designated, respectively, by reference numerals 41,42. Compressed air is tapped from a suitable compressed air supply source 38. Compressed air supply source 38 may be the aircraft turbojet power plant, or separate power plants, as so desired. Slots 24,25,26, and 27 are so shaped internally as to produce a spanwise oriented, tangential jet sheet clinging to the upper wing surface, as denoted by arrows 43,44 shown in FIG. 2 for slots 24,26 and arrows 45 shown in the left portion of FIG. 1 for adjacent slots 24,25.

These spanwise oriented jet sheets force separation of the chordwise attached boundary layer flow on the wing upper surface, at low angles of attack, and stimulate the formation of tightly rolled-up vortices at some spanwise position lying between the slot and the aircraft leading edge depending upon the jet momentum. Stimulated vortices produced by jet flow from slots 26,27 are schematically shown in the right portion of FIG. 1 and designated respectively, by reference numerals 46,47. These augmented vortices occur relatively close to the wing upper surface, thus creating a zone of suction, with the intensity and spanwise position being controlled by varying the jet momentum, as will be further explained hereinafter.

As discussed hereinbefore, the slots of each jet slot pair 24 and 25 and jet slot pair 26 and 27 are longitudinally separated with slots 24 and 26 being disposed forward of the aircraft center of gravity, on either wing panel, and slots 25 and 26 being disposed aft of the aircraft center of gravity. Flow valves 41,42 and the other two flow valves, not illustrated, are controlled by the aircraft pilot and serve to provide individual control to the respective slots to thereby allow the jet momentum from each slot 24,25,26,27 to be independently adjusted for best effectiveness and most economical utilization of the compressed air in supply tanks 39,40.

Figure 3:
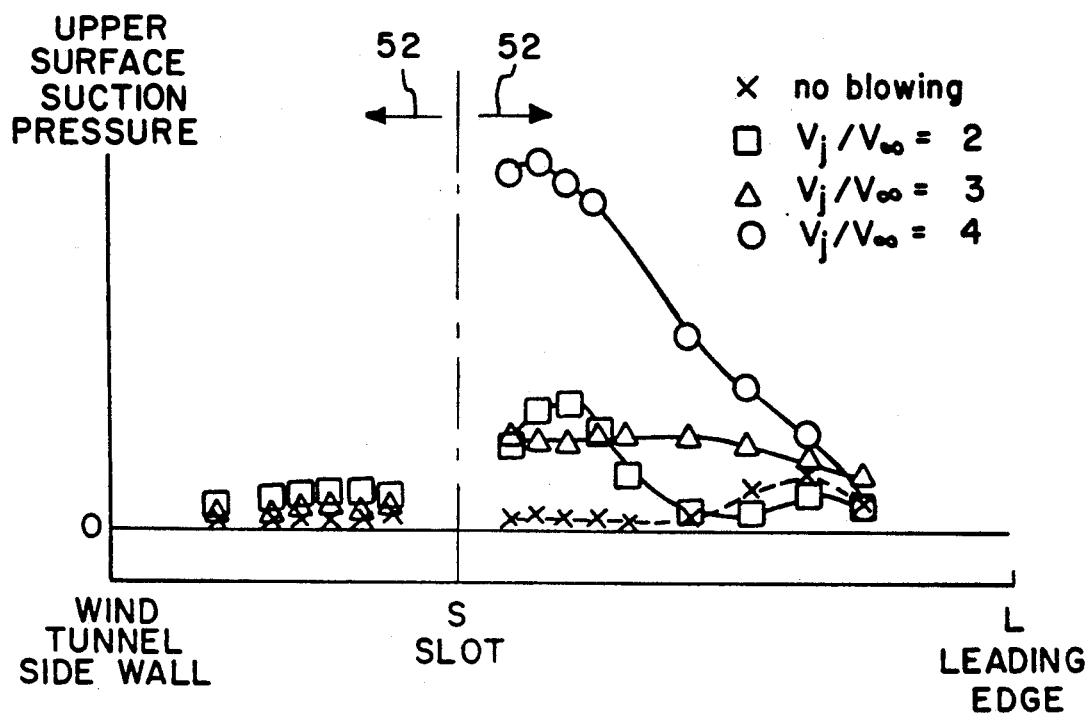
FIG. 3 is a graphical representation of the typical upper-surface suction pressures measured on a wind tunnel model of an exemplary aircraft wing employing slot blowing of the present invention at increasing jet-to-free stream velocity ratios.

Referring now to FIG. 3, a graphic illustration of typical upper-surface suction distributions measured on a half-wing wind tunnel test model of the aircraft shown in FIG. 1, is shown. The measurements taken illustrate the measured upper-surface suction pressures at a fixed angle of attack obtained by slot blowing at increasing jet velocity ratios wherein the area denoted by arrow 50 indicates the wing area between a slot (denoted by line S) and the aircraft centerline, or at the wind-tunnel side wall station labeled "0"; and the arrow 52 denotes the measurements taken along the wing span between the slot S and the wing leading edge L. As shown in the legend therein, FIG. 3 illustrates the upper surface suction pressures obtained by slot blowing at increasing velocity ratios wherein the ratio of Jet Velocity (Vj) to Forward Speed or Aircraft Velocity ($V_\infty$) is obtained. As apparent therein, as the jet velocity is increased, the measured upper surface suction pressure, and the wing surface area affected, also increases. The results illustrated in FIG. 3 were obtained in a wind tunnel with the aircraft model disposed at an angle of attack of 10° ($\alpha = 10°$).

Figure 4:
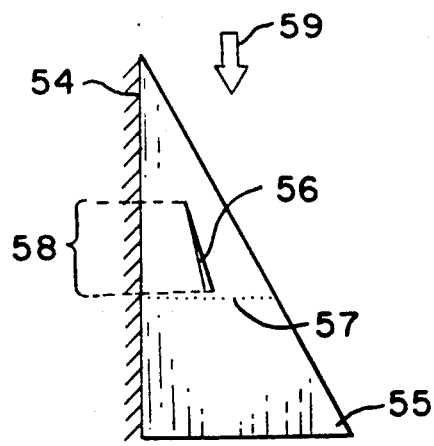
FIG. 4 is a schematic representation of a wind-tunnel test model employed to obtain the pressure measurements graphically shown in FIG. 3.

Referring now to FIG. 4, a right half wing panel model 55, projecting from the side-wall 54 of a wind tunnel, and employed to obtain the pressure measurements graphically illustrated in FIG. 3, is shown. As shown therein, a single slot 56 is employed at substantially the midpoint of the wing span and just forward of the aircraft center of gravity. A spanwise row of spaced pressure taps 57 are provided in the model wing upper surface and serve to measure the suction pressures induced by the jets in the wind tunnel test. The plenum chamber leading to slot 56 is disposed inside of wing panel 55, as denoted by the dotted line area 58. The direction of wind-tunnel free-stream flow is indicated by arrow 59.

Figure 5:
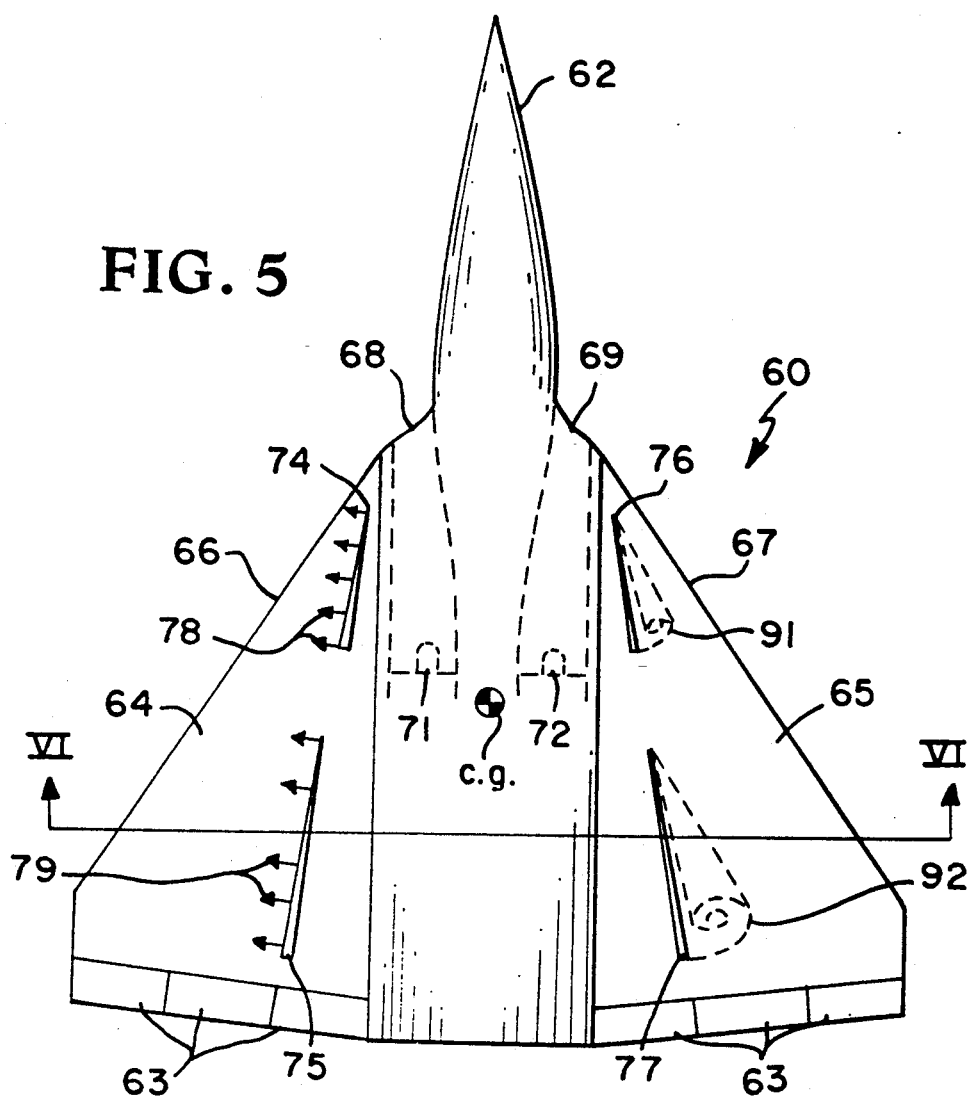
FIG. 5 is a part schematic top plan view of another exemplary highly swept delta wing, supersonic aircraft having an elongated nose and fuselage according to the present invention.
Figure 6:
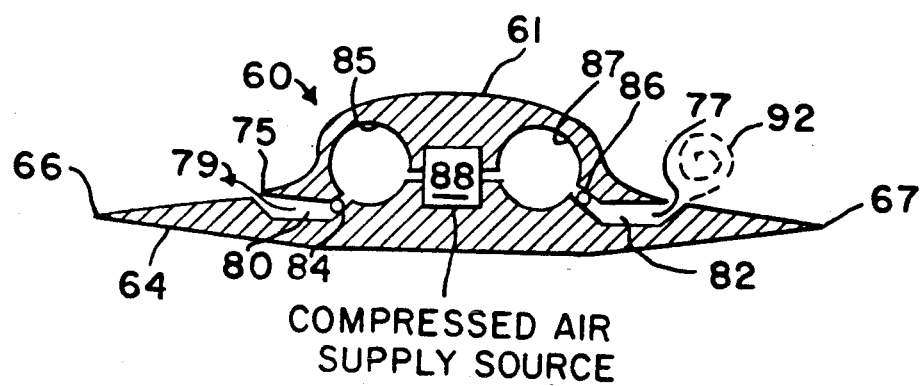
FIG. 6 is a part schematic sectional view of the aircraft shown in FIG. 5 and taken along line VI—VI thereof.

Referring now more particularly to FIGS. 5 and 6, the invention as applied to a delta wing, supersonic aircraft 60, having an elongated center fuselage 61 will now be described. As shown therein, delta wing supersonic aircraft 60 is provided with a substantially thick center line profile fuselage 61 terminating in an elongated sharp nose 62. Wing segments 64,65 are disposed on each side of fuselage 61 and extend aft from a point spaced from the sharp nose tip 62 along the remaining length of aircraft fuselage 61. A plurality of control flaps 63 are disposed along the aft ends of wing segments 64,65. Flaps 63 may be deflected differentially, individually, or in unison, and in a positive or negative direction. Flaps 63 are under the control of the aircraft pilot or they may be integrated into the automatic control system and employed, as needed, for assistance in take-off or landing of aircraft 60.

The leading edge 66,67 of respective wing segments 64,65 adjacent to fuselage 61 are provided with respective jet inlets 68,69. Inlets 68,69 serve to receive air for respective turbojet power plants 71,72, a portion of which are shown in dotted line in FIG. 6.

As in the previously described embodiment, a pair of spaced slots are disposed on each side of the centerline of aircraft 60, as designated by reference numerals 74,75 and 76,77. Slots 74,76 are disposed forward of the aircraft center of gravity (C.G.), while slots 75,77 are disposed aft of the aircraft center of gravity. Slot pairs 75,75 and 76,77 are positioned along separate imaginary rays, originating and extending aft from the point where the wing leading edges 66,67 join with respective jet inlets 68,69, swept inboard from the thin sharp leading edges 66,67, and spaced from the centerline of aircraft 60.

A separate plenum chamber is provided within aircraft 60 for each of the respective slots 74,75,76, and 77. Two of these plenum chambers are illustrated in FIG. 6 and designated by reference numerals 80,82 for respective slots 75,77. Individual conduits showing control valves therein lead from individual suitable pressure tanks, two of which are shown in FIG. 6. As shown therein, valve 84 serves to connect pressure tank 85 with plenum chamber 80, while valve 86 serves to connect pressure tank 87 with plenum chamber 82. The valves, pressure tanks and plenum chambers for slots 74,76 are of similar construction and are not shown or described further herein in the interest of brevity.

Slots 74,75,76 and 77 are shaped internally so as to produce a spanwise oriented jet sheet tangential and close to the upper wing surface, as denoted by arrow 78 for slot 74, and arrows 79 for slot 75. As in the previously described embodiment, compressed air for pressure tanks 85,87 is tapped from a suitable compressed air supply source 88. Turbojet power plants 71,72 may serve as the compressed air supply source, or separate power plants may be used for this purpose, as so desired.

Simulated vortices produced by jet flow from slots 76,77 are schematically shown on the right wing portion 65 and designated, respectively, by reference numerals 91,92.

The operation of the invention is believed to be apparent from the above detailed description. As discussed hereinbefore, the present invention is particularly adapted to the supersonic, flying wing type, aircraft to enhance the lift capability of these low aspect ratio, highly swept wing aircraft to thereby enable slower and safer landing on short runways. The stimulated vortex lift achieved by the spanwise blowing slots at low speeds and at low angles of attack when the wing vortices are weak or absent, while at the same time serving to generate a counter balancing nose-up moment and thereby permit the use of trailing edge flaps 22, serves to vastly improve the slow landing capability of these tail-less swept wing aircraft. Also, the individual control of the spanwise slots by the pilot permits the use of the stimulated vortex lift to generate controlled rolling moments for augmented lateral control of the aircraft.

Although the invention has been described relative to specific embodiments thereof, it is not so limited and there are obviously many variations and modifications of the invention that will be readily apparent to those skilled in the art in the light of the above teachings.

It is therefore to be understood that, within the scope of the appended claims, the invention may be practiced other than as specifically described herein.

What is claimed as new and desired to be secured by Letters Patent of the United States is:

1. In combination, a highly swept, delta wing aircraft and means to stimulate vortex lift on the aircraft comprising:
    said highly swept, delta wing aircraft having a sharp nose and a substantially thick center line profile;
    said thick center line profile tapering along portions of the aircraft length to highly swept, thin sharp leading edge wing surfaces;
    said means to stimulate vortex lift on the delta wing aircraft including a pair of spaced slots disposed on each side of, and adjacent to, said substantially thick center line of said aircraft and directed along the upper surface of the wing toward said thin sharp leading edge wing surfaces;
    each said pair of spaced slots being positioned along an imaginary ray originating from and extending aft of the wing apex, swept substantially inboard of said thin sharp leading wing edges, and adjacently spaced from said substantially thick aircraft center line;
    one member of each of said pair of spaced slots being disposed forward of the aircraft longitudinal center of gravity and the other member of each said pair of spaced slots being disposed aft of the aircraft longitudinally center of gravity;
    a separate plenum chamber for each of said spaced slots disposed within said aircraft;
    at least one compressed air source in fluid connection with each said plenum chamber; and
    means to selectively provide compressed air from said compressed air source to one or more of said plenum chambers whereby a spanwise oriented jet sheet is tangentially directed to and along the upper surface of the wing by one or more of said spaced slots and thereby stimulate vortex lift on the wing surface of the delta wing aircraft.

2. The combination of claim 1 wherein said means to selectively provide compressed air from said compressed air source to one or more of said plenum chambers includes individual flow valves disposed between said compressed air source and said plenum chambers.

3. The combination of claim 2 wherein said compressed air source comprises the aircraft turbojet power plant.

4. The combination of claim 1 wherein said highly swept delta wing aircraft is a tail-less, flying wing type aircraft provided with a sharp nose apex and said thick center line profile tapers along the entire aircraft length to said highly swept thin sharp leading edge surfaces.

5. The combination of claim 1 wherein said highly swept delta wing aircraft is provided with a fuselage having a sharp nose portion extending forward of a pair of highly swept wings and the apex of said highly swept wings are provided with turbojet engine inlets adjacent said fuselage and spaced from said sharp nose portion.

6. A method of enhancing the lift and aerodynamic control of a low aspect ratio, delta wing, supersonic aircraft during low angles of attack and subsonic landing speeds comprising the steps of:
    providing a highly swept, low aspect ratio, delta wing aircraft having a sharp nose and a substantially thick center line profile tapering on each side along at least a portion of the aircraft length to a highly swept, thin sharp leading edge wing surface;

providing a pair of spaced slots disposed on the upper wing surface on each side of the substantially thick center line of the aircraft and positioned along an imaginary ray originating from and extending aft of the wing apex, and swept substantially inboard of the thin sharp leading wing edges, and adjacently spaced from the aircraft longitudinal center line;

positioning the spaced slots such that one member of each pair is disposed forward of the aircraft longitudinal center of gravity and the other member of each pair of spaced slots is disposed aft of the aircraft longitudinally center of gravity with each spaced slot being shaped to direct a flow of air therefrom spanwise across the aircraft wing toward the adjacent aircraft leading edge;

providing a separate plenum chamber disposed within the aircraft and in fluid communication with each spaced slot;

providing a compressed air tank within the aircraft and in fluid communication with each plenum chamber; and providing control valves between each compressed air tank and one of the plenum chambers and under the control of the aircraft pilot to permit selective individual or multiple valve actuation to provide one or more sheets of transverse jet air flow from the spaced slots toward a leading edge of the aircraft to thereby stimulate vortex lift at selected stations along the aircraft wing and enhance the lift and aerodynamic control of the aircraft during low angle of attack subsonic flight and during landing.

7. The method of claim 6 including providing a plurality of pilot controlled trailing edge flaps on the aircraft and wherein only the slots disposed forward of the aircraft center of gravity are actuated by the pilot during a slow landing maneuver to thereby produce a counter balancing nose-up moment and render the trailing edge flaps more effective.

8. The method of claim 6 wherein the paired slots on one side of the aircraft center are actuated by the pilot to stimulate vortices on that side while the paired slots on the other side of the aircraft center remain inactive to thereby generate a rolling moment to the aircraft for augmented lateral control.

9. The method of claim 6 wherein the delta wing, supersonic aircraft is a tail-less, flying wing type aircraft provided with a sharp nose apex and the substantially thick centerline profile thereof tapers along the entire length of the aircraft to a highly swept, thin sharp leading edge wing surface.

10. The method of claim 6 wherein the delta wing supersonic aircraft is provided with a center fuselage forming the substantially thick centerline profile and having an elongated nose portion and wherein portions of the centerline profile tapering on each side of the fuselage are disposed spaced from the elongated nose portion.

* * * * *